Patented Mar. 31, 1953

2,633,478

UNITED STATES PATENT OFFICE 2,633,478

HYPOHALOGENATED ELASTOMERIC DERIVATIVE

Malcolm E. Gross, Akron, Ohio, assignor to The B. F. Goodrich Company, New York, N. Y., a corporation of New York No Drawing. Application April 10, 1952, Serial No. 281,669

6 Claims. (Cl. 260—772)

This invention relates to the preparation of hypohalogenated elastomeric derivatives, and particularly to hypochlorinated rubber derivatives. More particularly, this invention relates to improved partially hypochlorinated rubber derivatives used in adhesive compositions to adhere rubber and the like to metal or to other surfaces.

A conventional method of preparing a hypochlorinated rubber is to prepare separately an aqueous "bleach" solution of sodium hypochlorite and a solution of natural rubber in an organic solvent (benzene, xylene, etc.). The bleach solution is converted to hypochlorous acid by the addition of Dry Ice which generates carbonic acid, and the two solutions are then mixed and emulsified. The resulting reaction forms a partially hypochlorinated rubber which can be separated from the aqueous layer as either an organic solution or as a solid, rubbery material.

A major use of such partially hypochlorinated rubber derivatives is in the preparation of adhesive cements to adhere rubber to metal. When these cements are made on a commercial scale, however, the hypochlorous acid solution often stands an hour or more between the time when it is prepared and the time when it is used. A concentration of 27.8 grams of HOCl per liter at a pH of 7, drops to 24.2 grams per liter in 20 minutes and to 20.1 grams per liter in an hour. As a result of this decomposition, the hypochlorous acid can not effectively carry out its normal reactions with the rubber in solution. These reactions are believed to be:

(1) Rubber+HOCl→rubber chlorhydrin
(2) Rubber +HOCl→oxidative chain scission

The relative magnitude of these reactions depends upon the pH (hydrogen ion concentration) of the solution. When carbonic acid is used to form the hypochlorous acid, pH is about 7, and the two reactions takes place simultaneously. A lower pH favors Reaction 1; a higher pH favors Reaction 2.

When the hypochlorous acid solution has largely decomposed through standing before use, both reactions are severely minimized and the ultimate cement produced will not adhere rubber to metal strongly enough. A more stable solution of hypochlorous acid can be made if a slightly stronger acidifying agent such as acetic acid is used in place of carbonic acid. With acetic acid, however, the ultimate pH will be about 5.5 instead of 7; there will be almost no oxidation of the rubber, and the higher viscosity solutions which are obtained often contain gels that are difficult to process. Such conditions cause poorer adhesion results from the final cement.

It is an object of this invention to provide a method of preparing the partially hypochlorinated rubber so that cements with the desired adhesive activity between rubber and metal can be produced on a commercial scale.

It is a further object of this inevntion to provide a method of hypohalogenating rubber so as to control the relative rates of the oxidation and hypohalogenation reactions.

Another object is to provide a two-stage method for hypochlorinating rubber, one stage being carried out at a pH of 9 to 14, preferably 10 to 12, and the other stage being carried out at a pH of 4 to 9, preferably 6 to 8.

Other and further objects will be apparent from the description which follows.

My invention comprises reacting a rubber in solution in an organic solvent with an aqueous solution containing a hypohalite radical in two stages, one stage being carried out with the aqueous solution having a pH of 4 to 9, preferably 6 to 8, the other being carried out with the aqueous solution having a pH of 9 to 14, preferably 10 to 12.

The rubbery material which may be employed in my invention comprises any unvulcanized rubbery material possessing a structure made up of predominantly linear, long carbon chains including a multiplicity of intra-chain carbon to carbon double bonds, such as natural rubber, gutta percha, balata, latex rubber, guayule, artificial rubber isomers, rubbery polymers of open-chain conjugated dienes containing from 4 to 8 carbon atoms, such as butadiene-1,3, isoprene, chloroprene, 2,3-dimethyl butadiene-1,3, as well as rubbery copolymers of such dienes with materials copolymerizable therewith such as acrylonitrile, styrene, methyl acrylate, methyl methacrylate, methacrylonitrile, isobutylene, and other copolymerizable monomeric materials. For best results, it is desirable that the initial Mooney plasticity of the rubbery material (run with large rotor for four minutes at 212° F.)

should be from 15 to 28, the range from 20 to 22 being preferred.

Among the solvents for the rubber material which may be used alone or in combination in this invention are xylene, toluene, hexane, heptane, benzene, carbon tetrachloride, chloroform, ethylene dichloride, mono-, di-, and trichloroethanes, dipentene, and other common solvents for natural and synthetic rubbers as well as mixtures of these with small quantities of gasoline or esters such as butyl acetate.

The concentration of the rubber solution is preferably about 3% to 10% by weight of rubber with 5% being preferred. A 5% solution is easy to process and the entire weight of material is used in the ultimate adhesive cement with a minimum of solvent addition being required at that time. More concentrated solutions result in higher viscosity materials after oxidation, and solutions over 10% take an unreasonably long time to settle out in the emulsion separation step.

In the higher pH range the reaction is primarily an oxidation reaction causing scission of the long rubber molecules to produce shorter chains of lower molecular weight, as evidenced by reduced viscosity of the rubber solution. For best results, the oxidation should be carried to the point where the viscosity of a 5% by weight rubber solution is 12 ± 5 centipoises, preferably 8 to 12 centipoises.

In the lower pH range the reaction involves primarily addition of hypohalous acid to the double bonds of the rubber molecule, best results being provided by saturation of 30 to 50% of the available double bonds, so that the finished product comprises a hypohalogenated short-chain rubber having from 30% to 50% of its double bonds saturated with hypohalous acid.

Although either stage of the reaction may be carried out first, it has been found most convenient from a practical point of view to carry out the oxidation (at a high pH) first, and follow this by the addition reaction.

It is preferred to employ hypochlorous acid in this invention, although other hypohalous acids such as hypobromous may also be used. Any water-soluble metal salt of hypohalous acid may be used in the oxidation stage, although alkali metal and alkaline earth metal salts are preferred, particularly sodium, potassium, and calcium hypohalites. From $1.3 \times 10^{-2}$ to $5.4 \times 10^{-2}$ moles of such salts for each 100 grams of the rubber material have been found to produce the desired degree of oxidative scission, $2.0 \times 10^{-2}$ to $3.4 \times 10^{-2}$ moles being preferred.

The hypohalous acid used in the addition stage of the reaction is preferably formed in situ, since as pointed out above, aqueous solutions of this acid rapidly decompose upon standing. It may conveniently be formed by adding carbon dioxide, in the form of Dry Ice, to an aqueous solution of a metal hypohalite, although any other suitable acid, such as acetic acid for example, may be used in place of or in addition to the Dry Ice. From 0.45 to 1.0 mole of hypohalous acid per 100 grams of rubbery material are required to produce the desired degree of saturation of the double bonds, from 0.55 to 0.75 mole being preferred.

The temperature at which the two-stage reaction is carried out is not critical but may vary over a wide range from 0° to 50° C. or higher; ordinary room temperature (20°–25° C.) is usually most convenient.

The concentration of the aqueous hypohalite or hypochlorous acid solution is not critical although dilute solutions are of course preferred. In the oxidation stage, a concentration of 0.1% to 5% of hypohalite is desirable, from 0.5% to 2% being preferred, while somewhat higher concentrations of hypohalous acid may be used in the addition stage, in the range of 1% to 10% or more, from 3% to 7% giving best results.

The two-stage method of this invention results in a product of much greater uniformity and consequently one having much greater adhesive activity as compared to products hitherto known.

To illustrate how my invention is carried out, the following example is described.

*Example*

Twenty grams of pale crepe rubber were masticated on a cool mill till Mooney plasticity (run with a large rotor for four minutes at 212° F.) was 20. The rubber was then dispersed in xylene on a roller mill to produce a solution containing 5% rubber by weight. Brookfield viscosity of the solution was 50 centipoises using No. 1 spindle at 60 R. P. M.

"Bleach" solution was prepared by bubbling chlorine gas into a mixture of 427 grams of ice and 119 grams of 50% aqueous caustic soda (NaOH) until there was a net weight increase of 50 grams. Upon analysis, this bleach showed 1.34 moles (100 grams) per liter of sodium hypochlorite (NaOCl), 0.1 mole (4 grams) per liter excess NaOH and had a pH of 12. A 4.5 cc. portion of this bleach was diluted to 45 cc. and stirred into the rubber solution for 60 minutes at room temperature. Viscosity of the rubber solution dropped from 50 to 10 centipoises as the oxidation of the rubber took place.

Next, 86 cc. of the original bleach solution were diluted with 83 cc. of water. This mixture was added to the rubber solution simultaneously with 75 grams of Dry Ice at such a rate that the Dry Ice was always in excess. As HOCl formed and prevented further oxidation of the rubber, the solution pH kept dropping constantly. The emulsion was stirred for 60 minutes from the time the Dry Ice-bleach addition started. After the reaction was complete 0.4 gram of 2,5-di-tertiary-butyl paracresol, equal to 2.0% on the rubber solids, were added to prevent air oxidation and aging, and 240 grams of calcium chloride dihydrate were added to aid in separating the aqueous phase from the xylene solution. After 30 minutes' agitation the mixture was allowed to settle. The organic layer rose to the top on standing overnight and was decanted. It was then centrifuged to remove a mixture of residual "fines" of calcium chloride dihydrate and a reaction product, calcium carbonate. The hypochlorinated rubber solution was amber in color and had a viscosity of 12 centipoises.

The adhesive activity of this partially hypochlorinated derivative was evaluated in an adhesive cement as follows:

Hypochlorinated rubber solution
  prepared as described above____ 81.0 g. (5.18 g.
  20 cps. chlorinated natural rub-  solids)
  ber_____ 32.0 g.
Xylene_____ 40.0 g.
Carbon tetrachloride_____ 26.0 g.

This adhesive was tested for bonding both natural rubber and GR–S tread compositions to steel by ASTM procedure, D–429–47T. The compositions employed were as follows:

Recipes

| | Material | Amount |
|---|---|---|
| Natural Rubber—Cured 30' at 307° F. | Smoked sheet | 100 |
| | Peptizer | 1 |
| | Zinc oxide | 5 |
| | Trimethyldihydroquinoline polymer | 1 |
| | Carbon black | 50 |
| | Stearic acid | 3 |
| | Pine tar | 1 |
| | 2,2'-benzothiazyl disulfide | 1 |
| | Sulfur | 3 |
| | | 165 |
| GR-S—Cured 35' at 307° F | GR-S | 100 |
| | Peptizer | 2 |
| | Zinc oxide | 5 |
| | Carbon black | 50 |
| | Sulfur | 2 |
| | 2,2'-benzothiazyl disulfide | 1.5 |
| | Copper diethyldithiocarbamate | 0.1 |
| | | 160.6 |

The resulting composite articles showed excellent adhesion between the rubber composition and the steel base. It is thus seen that the improved hypochlorinated rubber derivative has led to a cement with good adhesive properties for both natural and synthetic rubbers and steel.

Although calcium chloride or calcium chloride dihydrate or mixtures thereof have been most satisfactory as emulsion-breaking agents, any other conventional emulsion-breaking agent which is inert to the ingredients of the mixture may be employed.

Likewise any conventional age-resister for rubber compositions may be employed to prevent deterioration of the adhesive on aging. Among those which may be used are phenyl-beta-naphtheylamine, phenyl-alpha-naphthylamine, diphenyl paraphenylenediamine, and many others which are well known to the art.

While the invention has been described with reference to certain specific embodiments, it is not my intention to be limited thereto, for variations and modifications of the invention are possible without departing from the spirit and scope of the invention as defined in the appended claims.

I claim:

1. The method of preparing a hypohalogenated rubber derivative which comprises dispersing a rubber in an organic solvent and reacting said dispersion separately with 0.45 to 1.0 mole of hypohalous acid in aqueous solution at a pH of 4 to 9 for each 100 grams of rubber and with $1.3 \times 10^{-2}$ to $5.4 \times 10^{-2}$ mole of a metal salt of hypohalous acid in aqueous solution at a pH of 9 to 14 for each 100 grams of rubber.

2. The method of preparing a hypohalogenated rubber derivative which comprises reacting a rubber in solution in an organic solvent with an aqueous solution containing $1.3 \times 10^{-2}$ to $5.4 \times 10^{-2}$ mole of a metal salt of hypohalous acid at a pH of 8 to 14, per 100 grams of rubber, and subsequently reacting the product with an aqueous solution containing from 0.45 to 1.0 mole of hypohalous acid at a pH of 4 to 9, and separating the hypohalogenated rubber product from the aqueous phase.

3. The method of claim 2 where the hypohalous acid is hypochlorous acid.

4. The method of preparing a hypochlorinated rubber derivative which comprises reacting a rubber in solution in an organic solvent with an aqueous solution containing $2.0 \times 10^{-2}$ to $3.4 \times 10^{-2}$ mole of a metal salt of hypochlorous acid per 100 grams of rubber at a pH of 10 to 12, and subsequently reacting the product with an aqueous solution containing from 0.45 to 1.0 mole of hypochlorous acid at a pH of 6 to 8, and separating the hypochlorinated rubber product from the aqueous phase.

5. The method of preparing a hypochlorinated rubber derivative which comprises reacting natural rubber in dilute xylene solution with an aqueous solution containing $2.0 \times 10^{-2}$ to $3.4 \times 10^{-2}$ mole of sodium hypochlorite per 100 grams of rubber at a pH of 10 to 12, and subsequently reacting the partially oxidized product with an aqueous solution containing from 0.45 to 1.0 mole of hypochlorous acid at a pH of 6 to 8, and separating the hypochlorinated rubber product from the aqueous phase.

6. The method of preparing a hypochlorinated rubber derivative which comprises reacting a solution containing 3% to 10% by weight of a rubber dispersed in an organic solvent with $2.0 \times 10^{-2}$ to $3.4 \times 10^{-2}$ mole of an alkali metal hypochlorite in aqueous solution per 100 grams of rubber at a pH of 10 to 12 at a temperature of 20% to 25° C., and subsequently reacting the product with 0.45 to 1.0 mole of hypochlorous acid in aqueous solution at a pH of 6 to 8, said hypochlorous acid being generated in situ during the reaction by adding Dry Ice to an aqueous solution of an alkali metal hypochlorite, and separating the hypochlorinated rubber product from the aqueous phase.

MALCOLM E. GROSS.

No references cited.